Patented July 4, 1933

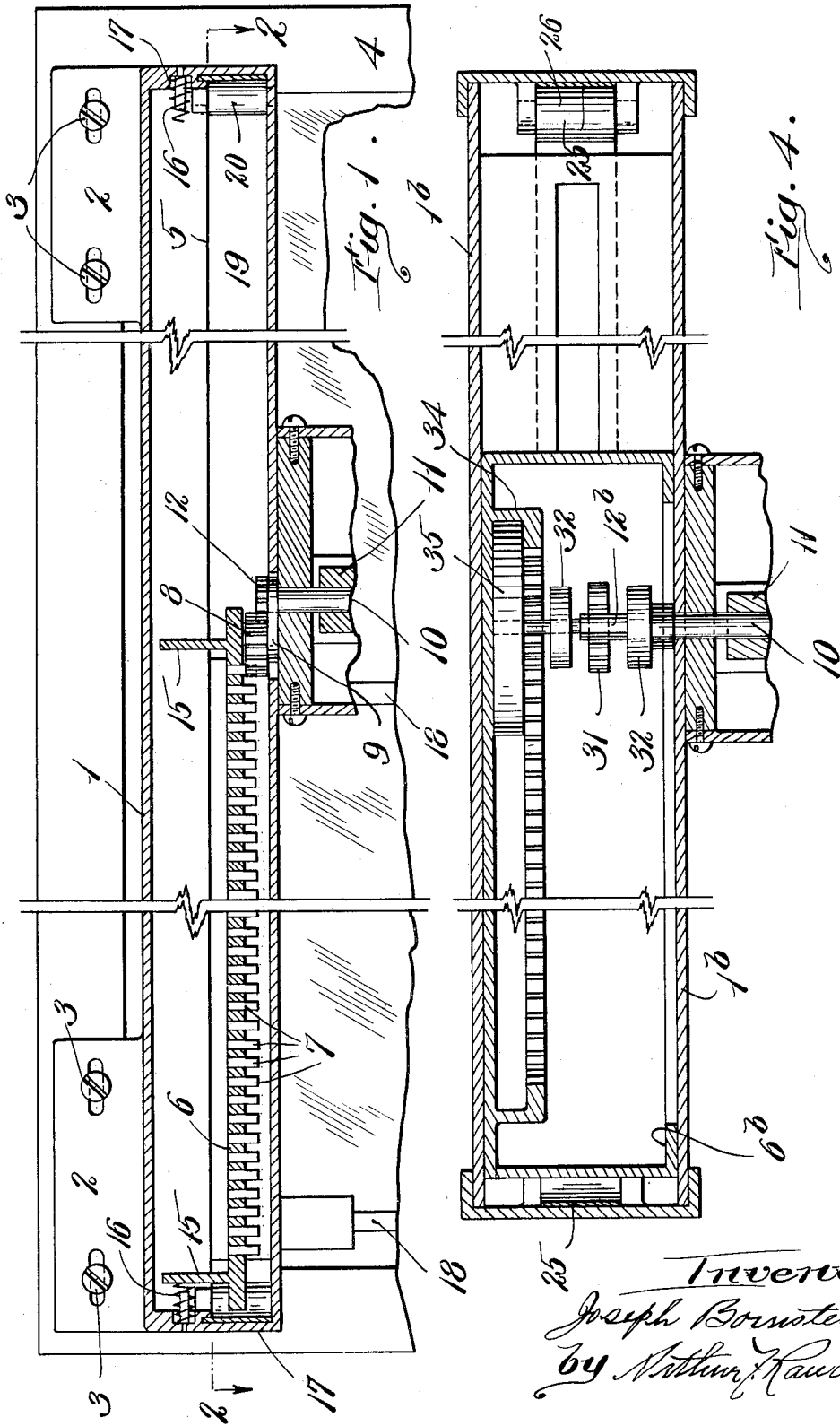
July 4, 1933.   J. BORNSTEIN   1,917,201
WIPER MECHANISM FOR WINDSHIELDS AND THE LIKE
Filed March 21, 1930   5 Sheets-Sheet 1

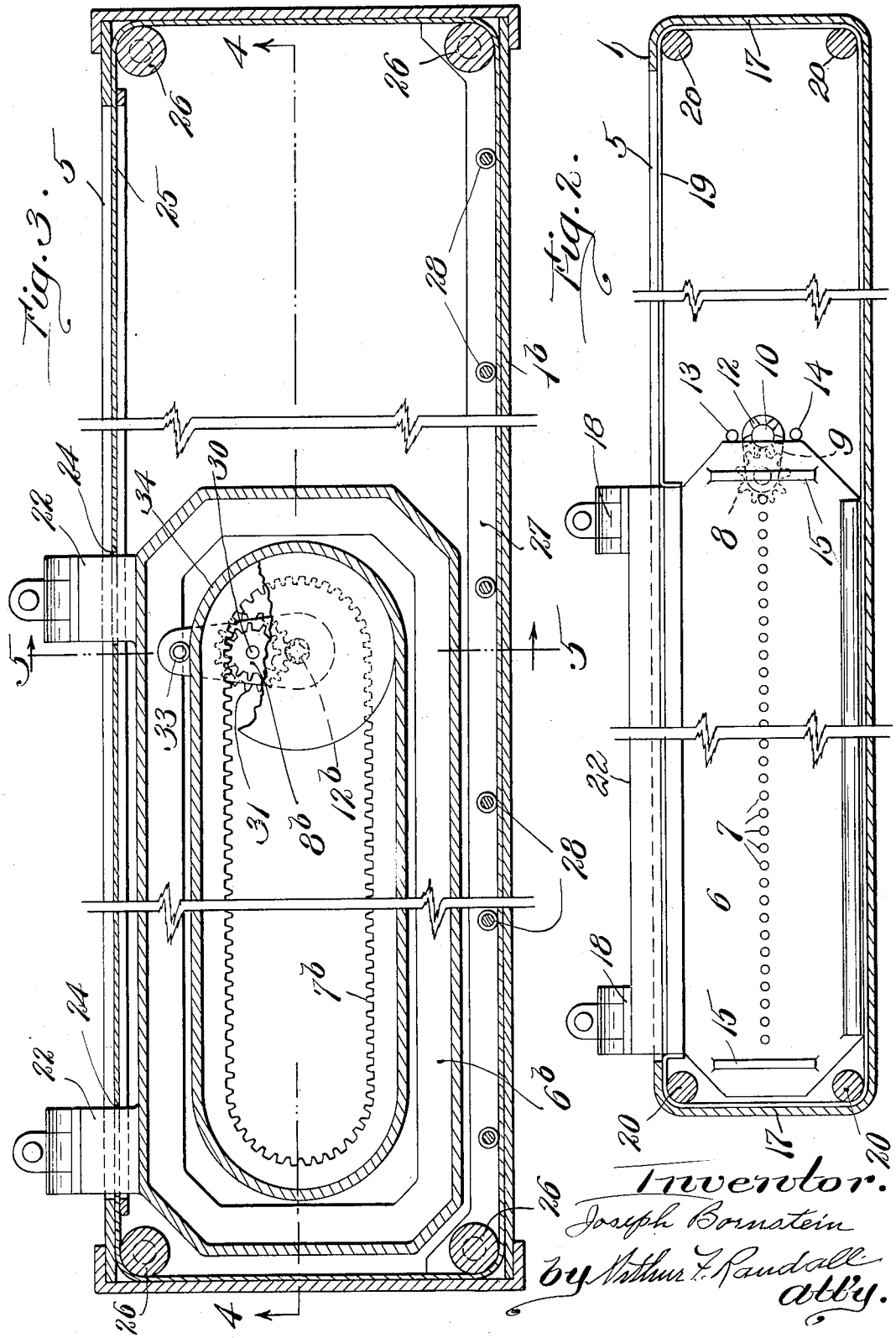

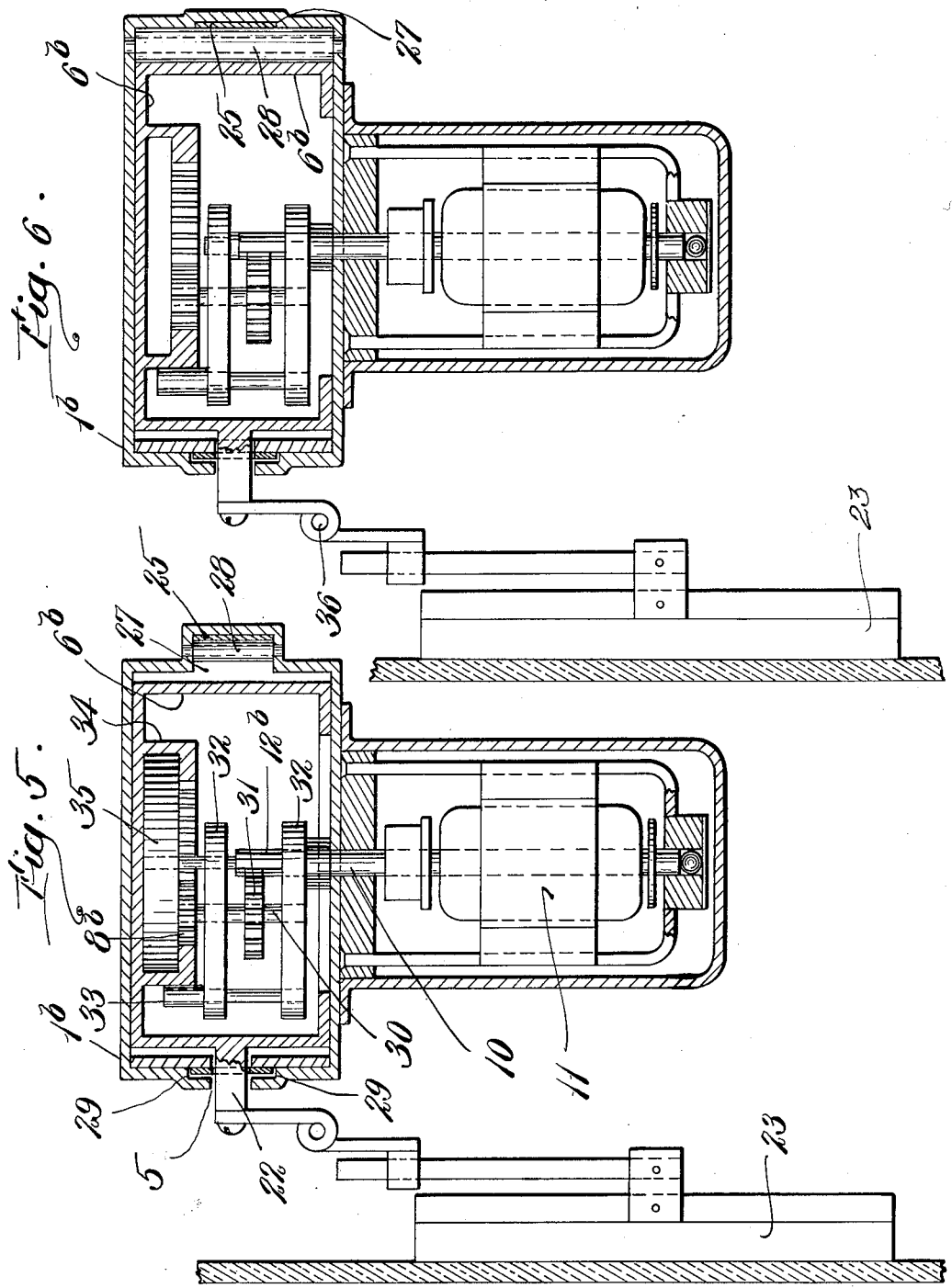

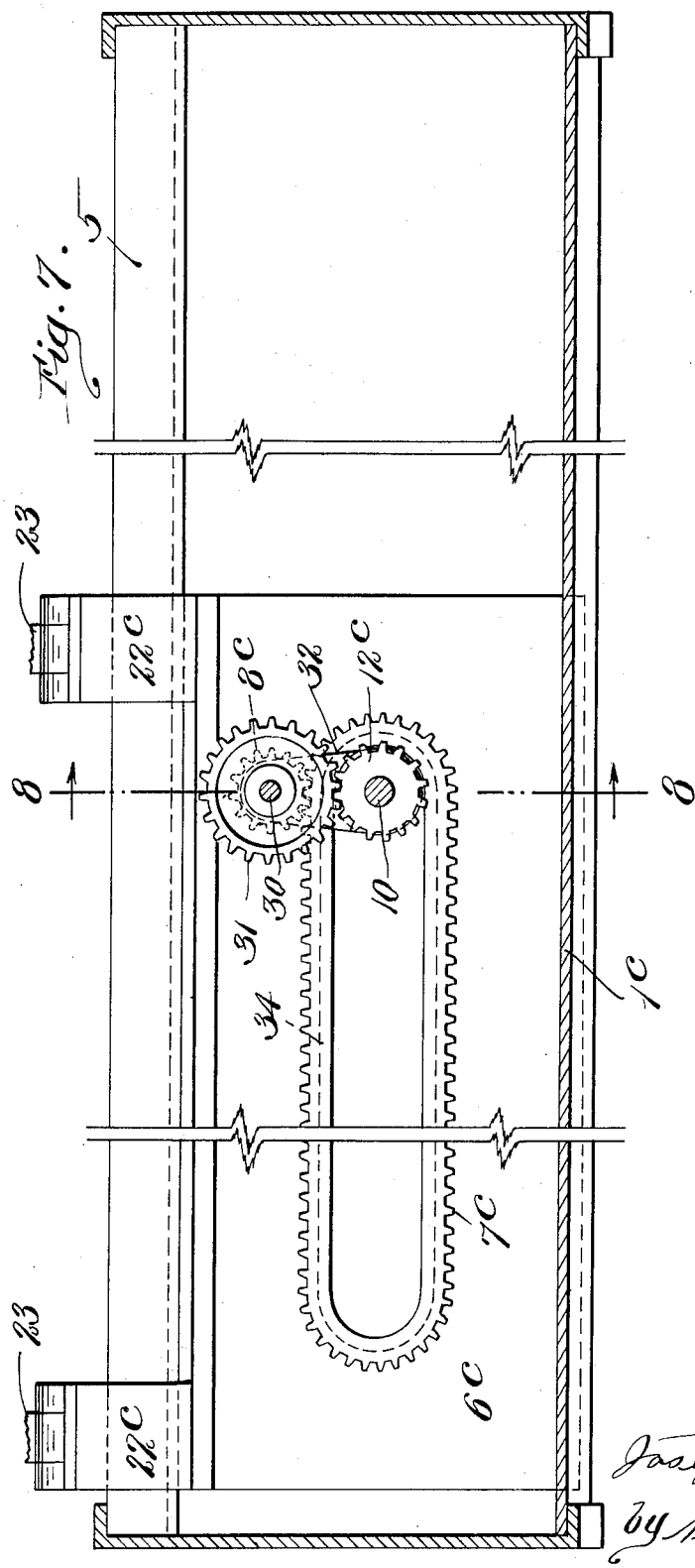

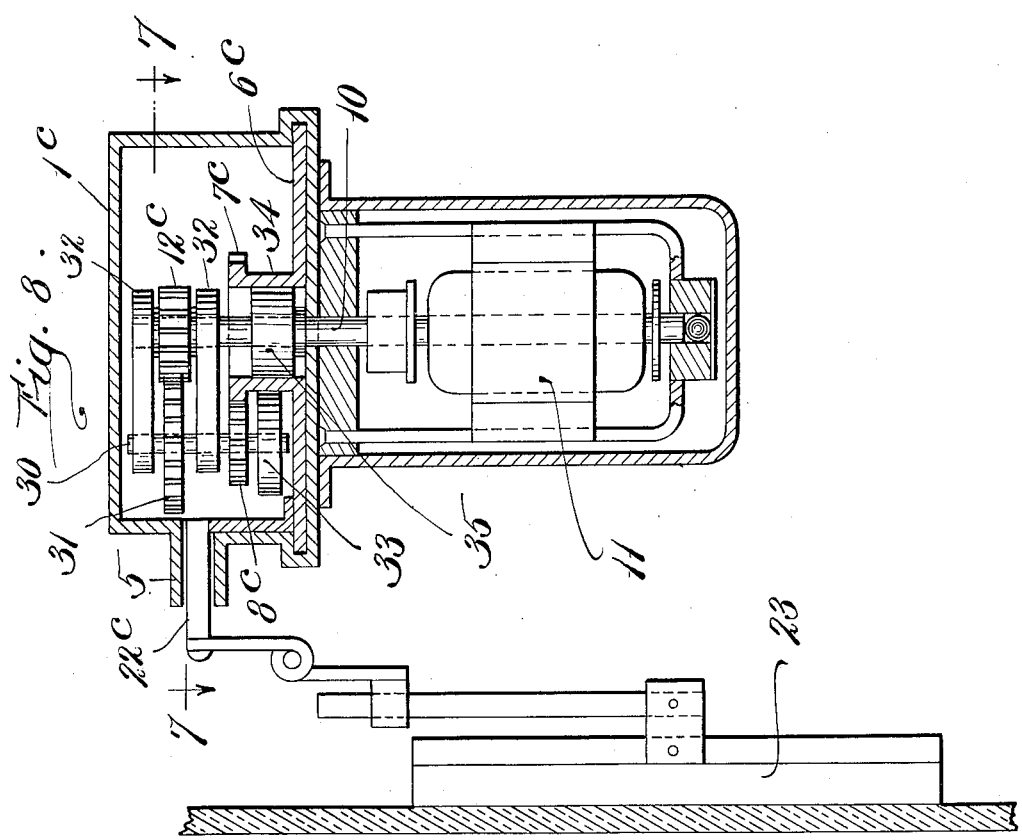

1,917,201

UNITED STATES PATENT OFFICE

JOSEPH BORNSTEIN, OF BOSTON, MASSACHUSETTS, ASSIGNOR TO LOUIS BORNSTEIN, OF QUINCY, MASSACHUSETTS

WIPER MECHANISM FOR WINDSHIELDS AND THE LIKE

Application filed March 21, 1930. Serial No. 437,713.

My invention relates to wiper mechanisms for windshields and especially to wiper mechanisms of that class in which one or more wiper elements are reciprocated back and forth, usually horizontally, across the glass of the windshield.

The object of my invention is to improve the construction and mode of operation of devices of this class.

Wiper mechanisms for windshields and the like have heretofore been constructed comprising a frame on, or within, which was mounted a rack-slide that was reciprocated back and forth by means of a pinion connected with a shaft that was continuously driven in one direction. In one form of mechanism heretofore proposed this shaft was the armature shaft of an electric motor which was pivotally mounted on the frame of the mechanism. The rack-slide was also mounted on the frame of the mechanism so as to be moved back and forth in a rectilinear path by said pinion, and the motor was pivotally mounted on the frame of the mechanism so that the pinion could swing from one side of the rack to the opposite side thereof as the rack-slide reached the limit of its movement in each direction.

One feature of my invention provides an improved wiper mechanism of the type just described wherein the continuously driven shaft is supported in fixed bearings and the pinion moves independently from one side of the rack-slide to the opposite side thereof at the completion of each stroke of said slide.

Thus, if the shaft referred to is the armature shaft of an electric motor, the latter is fixed to the frame of the mechanism thus relieving the pinion and rack of the work of shifting the heavy motor bodily on the frame.

Also, in all previous wiper mechanisms for windshields of that class comprising a slotted tubular housing-frame enclosing the means by which the wiper element was reciprocated back and forth across the windshield glass, and with which I am familiar, there has existed the highly objectionable feature that sand, dust and other foreign matter would be blown through the slot of the tubular housing frame into the latter, thus resulting in injury to the parts, particularly the bearing surfaces of the latter, and interfering with the proper operation of the mechanism. It is a feature of my present invention that the frame of the mechanism is a slotted tubular structure within which is arranged the wiper-operating mechanism including means that extends through the slot of the frame structure to the wiper element with which is associated means whereby the slot of the frame structure is maintained completely closed at all times, so that dust, sand or other foreign matter, is prevented from passing into the interior of the housing through said slot.

Other features of my invention are hereinafter pointed out.

In the accompanying drawings:

Figure 1 is a front elevation of a portion of a windshield equipped with a wiper mechanism embodying one form of my invention.

Figure 2 is a section on line 2—2 of Figure 1.

Figure 3 is a sectional plan view of a wiper mechanism embodying a second form of my invention.

Figure 4 is a section on line 4—4 of Figure 3.

Figure 5 is a section on line 5—5 of Figure 3.

Figure 6 illustrates a modification of the form of my invention illustrated in Figs. 3, 4 and 5.

Figure 7 is a sectional plan view of a portion of a wiper mechanism embodying another form of my invention.

Figure 8 is a section on line 8—8 of Figure 7.

The form of my invention illustrated in Figs 1 and 2 comprises a tubular sheet metal frame 1 provided upon its exterior with apertured ears 2, 2 fastened by means of screws or bolts 3 to the frame 4 of the windshield. The rear wall of the frame 1 is made with a longitudinal slot 5.

Within the tubular frame 1 is mounted a rack-slide 6 provided upon its under side with a straight rack of studs or teeth 7 to co-operate with a pinion 8 that is rotatably supported by an arm or carrier 9 loosely pivoted upon a shaft 10 that is continuously rotated in one direction when the mechanism is in operation. This shaft 10 is journaled in fixed bearings provided on the frame of the mechanism and may be the armature shaft of an electric motor 11 whose frame is secured rigidly to the bottom wall of the tubular housing-frame 1.

On the upper end of the shaft 10 is fixed a pinion 12 which drives the pinion 8 continuously in one direction. The arm 9 is free to swing on the axis of the shaft 10 to a limited extent determined by the stops 13 and 14 provided on the frame of the mechanism.

Upon its top side the rack-slide 6 is made adjacent its ends with upstanding lugs 15 to cooperate with abutment springs 16 provided upon the opposite end walls 17 of the tubular frame 1.

As the pinion 8 rotates it alternately traverses the opposite sides of the straight rack 7 thereby reciprocating the rack-slide 6 which is guided in a rectilinear path by the frame 1. As the rack-slide 6 nears the end of its movement in either direction it engages and compresses the spring 16 that is ahead of it and then as the pinion 8 comes into engagement with the endmost stud or tooth 7, it swings itself laterally across the path of the straight row or rack of teeth 7 from one side of the latter to the opposite side thereof and, as will be clear, the compressed spring 16 assists the pinion 8 in reversing the direction of movement of the rack-slide 6. Thus the continuously rotating pinion 8 is caused to alternately traverse opposite sides of the straight rack 7 thereby to reciprocate the rack-slide 6 along a rectilinear path. It will also be clear that this lateral movement of the pinion 8 is effected independently of the motor 11 which remains in a fixed position on the frame of the mechanism.

The rear side portion 22 of the rack-slide 6 extends through the slot 5 to the exterior of the tubular frame 1 where it has fastened to it the upper ends of the stems 18 of a pair of wiper elements, which are yieldingly held by spring pressure against the glass 21, Fig. 1, of the windshield as usual.

Associated with the rack-slide 6 is a flexible closure band 19 which may be made from thin sheet metal, one end of said band being fastened to one end of the rack-slide and the opposite end of said band being fastened to the opposite end of said rack-slide. The intermediate portion of the closure band 19 extends around four guide rolls 20, one of which is provided within each corner of the frame 1.

The rear end portions of the closure band 19 which are secured to the rack-slide 6 occupy positions against the inner side of the rear wall of frame 1 opposite the slot 5 therefore while the portion of rack-slide 6 that is within said slot 5 completely fills the latter. It will therefore be clear that at all times the slot 5 throughout its length is completely closed by the rack-slide 6 and the closure band 19 which latter renders around the guide rolls 20 as the rack-slide 6 is reciprocated. In this manner the interior of the tubular frame 1 is completely inclosed so that the entrance of dust, sand or other foreign matter into the same is prevented.

So far as I am aware no construction has ever heretofore been proposed in connection with a wiper mechanism comprising a tubular slotted housing-frame, for maintaining the slot thereof completely closed at all times.

This closure feature of the above described mechanism is of considerable practical importance for the reason that heretofore sand, dust and other foreign matter would be blown through the slot of the housing-frame into the interior thereof which resulted in the rapid destruction of bearing surfaces and also, by mixing with the lubricant employed in connection with the mechanism within the housing-frame, would seriously interfere with the operation of the device.

The form of my invention illustrated in Figs. 3, 4 and 5 includes a tubular sheet metal frame 1b whose rear wall is formed with a longitudinal slot 5. Within this tubular frame 1b is movably mounted a rack-slide 6b made upon its rear side with extensions 22 occupying the slot 5 of frame 1b and with each of which is connected a wiper element 23 as shown in Fig. 5.

The extensions 22 project through apertures 24 provided in an endless closure band 25 which extends around band-supporting and guiding rolls 26, Fig. 3, arranged within the tubular frame, one at each corner thereof. The front or forward stretch of the endless closure band 25 occupies a position within a longitudinal groove 27 provided upon the inside of the front wall of the frame 1b and is held in position therein by means of rollers 28 journaled in bearings on frame 1b.

The rear wall of frame 1b is made, at opposite sides of slot 5, with grooves 29 within which the top and bottom marginal portions of the rear stretch of closure band 25 are slidably mounted so that the side walls of said grooves serve to hold said stretch in position to close the slot 5 of the frame at all times and throughout its length. It will be clear that as rack-slide 6b is reciprocated the endless band 25 renders around the rolls 26 while maintaining the slot 5 closed.

The rack-slide 6b is made with an endless internal rack of teeth 7b that is engaged and traversed by a pinion 8b. This pinion 8b is fast on a short shaft 30 which also carries a gear 31 that is driven by a pinon 12b formed upon the upper end of the armature shaft 10 of an electric motor 11.

The shaft 30 is journaled upon a carrier comprising a pair of arms 32 that are pivotally mounted upon the armature shaft 10 and these two arms also support a guide roller 33 which bears against the outer side of an endless rail or track 34 provided on rack-slide 6b, said rail 34 being parallel with the rack of gear teeth 7b. Upon the upper end of the armature shaft 10 is loosely mounted a large guide roll 35 which engages the inner side of the rail 34.

During the operation of the mechanism illustrated in Figs. 3, 4 and 5 the motor 11 acts through the connections described to continuously rotate the rack-engaging pinion 8b in one direction so that said pinion continuously traverses the endless rack 7b thereby reciprocating the rack-slide 6b. It will be clear that the guide rolls 33 and 35 engage the endless rail 34 at all times so as to maintain the pinion 8b in proper engagement with the rack 7b.

In the modification illustrated in Fig. 6 the guide roll 35 of Figs. 3, 4 and 5 is omitted and the rollers 28 are disposed so that they are engaged by the front side of the rack-slide 6b thereby to support the latter against the sidewise pressure exerted upon the same by the reaction of the wiper springs 36. Otherwise the construction of the mechanism in Fig. 6 is the same as that described in connection with Figs. 3, 4 and 5.

The form of my invention illustrated in Figs. 7 and 8 includes a slotted tubular housing-frame 1c within which is movably mounted a rack-slide 6c constructed with an external endless rack of gear teeth 7c that is engaged and traversed by a pinion 8c that is continuously driven by an electric motor 11 whose frame is immovably fastened to the bottom wall of frame 1c. The armature shaft 10 of this motor has fast on it a gear 12c that is in mesh with another gear 31 fast on a shaft 30 which also carries the gear 8c and a guide roll 33, the latter being in rolling engagement with an endless track 34 on rack-slide 6c which track is parallel with the rack of teeth 7c.

The roll 33, pinion 8c and gear 31 are all fast on the shaft 30 which is journaled in bearings provided on carrier arms 32 that are pivotally and loosely mounted on the armature shaft 10.

The rack-slide 6c is made with extensions 22c projecting through the slot 5 of frame 1c, each of said extensions having a wiper element 23 connected with its outer end.

The armature shaft 10 also carries a loose roll 35 engaging the inner side of the endless rail 34.

During the operation of the mechanism illustrated in Figs. 7 and 8 the continuously rotating pinion 8c continuously traverses the endless rack 7c thereby reciprocating the rack-slide 6c to move the wiper elements 23 back and forth across the windshield glass.

In Figs. 7 and 8 the closure band for the slot 5 is omitted and the rest of the construction differs from that illustrated in Figs. 3, 4 and 5 mainly with respect to the rack 7c which, in Figs. 7 and 8 is an external rack while in Fig. 3 the rack 7b is an internal rack.

What I claim is:—

1. In combination, a frame including as a part thereof a tubular housing made at one side thereof with a longitudinal slot; a shaft journaled on said frame that is continuously driven in one direction; a rack-slide within and shielded by said housing made with a longitudinally disposed rack of teeth, said rack-slide being directly mounted upon and slidably supported by said frame so as to be reciprocable longitudinally within said tubular housing while held against lateral movement relatively to said frame; a pinion within and shielded by said housing, said pinion continuously engaging said rack of teeth; a carrier for said pinion that is pivotally supported within said housing to swing on an axis coincident with the axis of said shaft; means within said housing through which said shaft drives said pinion to cause the latter to traverse said rack thereby to reciprocate said rack-slide, a work-performing instrument outside of said tubular housing, and means connecting said instrument with said rack-slide so that said instrument is reciprocated by and with said rack-slide, said means extending through said slot.

2. A mechanism of the class described constructed in accordance with claim 1, wherein said continuously driven shaft is the armature shaft of an electric motor and wherein said motor is fixedly mounted upon the exterior of said tubular housing portion of the frame with its armature shaft extending through an aperture provided in one wall of said tubular housing portion to the interior thereof.

3. In combination a frame including as a part thereof a tubular housing portion made at one side thereof with a longitudinal slot; a reciprocatory member movably mounted within and shielded by said housing; driving mechanism within said housing portion for moving said member back and forth longitudinally; a work performing instrument outside of said housing; means connecting said instrument and said member, said means extending through said slot and being movable back and forth therein with said member; and a flexible closure band for said slot movably mounted on said frame and connected with said reciprocatory member so as to be moved endwise with the latter, said closure band serving at all times to maintain closed the portions of said slot between said connecting means and the two opposite ends of said slot while said connecting means is traversing the latter so that said driving mechanism is at all times completely inclosed and shielded by said frame and closure band.

4. In combination, a frame including as a part thereof a housing portion made at one side thereof with a longitudinal slot; a reciprocatory work performing instrument outside of said slotted portion and supported so that it is movable back and forth longitudinally with respect to said housing portion; power driven mechanism within said housing portion for reciprocating said instrument; a connection extending from said wiper element through said slot to said power driven mechanism, and slot closure means movable bodily by and with said connection for maintaining closed at all times the portions of said slot between each end of the latter and said connection so that said power driven mechanism is at all times completely inclosed and shielded by said housing portion and said closure means.

5. A mechanism of the class described constructed in accordance with claim 4, wherein the slot closure means is constituted by two band sections of thin flexible sheet metal which are moved endwise along said slot into and out of the interior of said frame as said connection traverses said slot.

6. A mechanism of the class described constructed in accordance with claim 4 wherein said closure means is constituted by a thin flexible band of sheet material housed within said frame and movable endwise along said slot, and wherein means is provided on said frame for guiding said band when it is moved endwise along said slot with said connection.

7. A mechanism of the class described constructed in accordance with claim 4, wherein said slot closure means consists of two band sections of thin flexible sheet material that are moved endwise on said frame with said connection, and wherein guide-ways are provided on said frame at opposite sides of said slot within which the opposite side marginal portions of each band section are slidably mounted and supported against buckling.

8. In combination a frame including as a part thereof a tubular housing portion made at one side thereof with a longitudinal slot; a work performing instrument upon the outside of said housing portion; mechanism within said housing portion for operating said instrument; a connection extending from said instrument through said slot to said operating mechanism, and flexible slot closure means mounted on said frame and movable with said connection for maintaining closed at all times the portions of said slot between the opposite ends thereof and said connection so that said mechanism is at all times completely inclosed and shielded by said housing portion and said closure means.

9. In combination, a frame including as a part thereof a tubular housing portion made at one side thereof with a longitudinal slot; a reciprocatory work performing instrument outside of said slotted tubular portion and supported so that it is movable back and forth longitudinally with respect to said tubular housing portion; power driven mechanism within said tubular housing portion for reciprocating said instrument; a connection extending from said instrument through said slot to said power driven mechanism and two band sections of flexible sheet material slidably supported by said frame each operable to maintain closed at all times the portion of said slot between one end thereof and said connection so that said mechanism is at all times completely inclosed and shielded by said housing portion and said closure band sections, said sections being movable endwise with said connection longitudinally with respect to said slot, as said connection traverses the latter.

10. In a mechanism of the class described, in combination, a frame including as a part thereof a tubular longitudinally slotted portion; a shaft journaled on said frame that is continuously driven in one direction; a rack-slide mounted within said tubular portion and movable back and forth longitudinally therein on a rectilinear path, said rack-slide being made with an endless rack of teeth; a pinion continuously engaging said rack of teeth; a carrier for said pinion that is pivotally supported to swing on an axis coincident with the axis of said shaft; means through which said shaft drives said pinion to cause the latter to traverse said rack thereby to reciprocate said rack-slide, and means for maintaining the slot of said frame completely closed at all times.

11. A mechanism of the class described constructed in accordance with claim 10, wherein said last mentioned means consists of a flexible closure band movably mounted within said tubular frame and connected with said rack-slide.

12. In a mechanism of the class described, the combination of a housing frame formed at one side thereof with a longitudinal slot; power driven instrument reciprocating mechanism within said tubular frame; a work performing instrument outside of said frame that is reciprocated by said mechanism; and flexible closure means for said slot slidably mounted on said frame and co-operating with said housing frame to at all times completely inclose and shield said power driven mechanism, said closure means being reciprocated endwise in a direction lengthwise of said slot by said mechanism in unison with the movements imparted to said instrument by the latter.

13. The combination with a slotted housing frame and instrument-actuating mechanism including a shaft supported by said frame and continuously driven in one direction, a rack-slide mounted within said slotted frame and reciprocable longitudinally thereof, said rack-slide being made with a straight rack of teeth; means through which said shaft reciprocates said rack-slide, and an instrument-carrying connection extending through the slot of said frame to said rack-slide and movable with the latter back and forth lengthwise of said slot, of a flexible sheet metal slot closure-band slidably mounted on said frame at each side of said connection and movable endwise with the latter.

14. In combination a movably supported work-performing instrument that is reciprocated on a rectilinear path; mechanism for reciprocating said instrument, and a housing completely inclosing and shielding said mechanism at all times, said housing including a fixed frame having a wall comprising a flexible closure band mounted in ways on said fixed frame and movable endwise with said instrument in part longitudinally of said fixed frame and in part transversely of said fixed frame so that it is not projected beyond either end of the latter.

Signed by me at Boston, Suffolk County, Massachusetts, this 19th day of March, 1930.

JOSEPH BORNSTEIN.